Dec. 21, 1926. 1,611,843
E. VAN ALTENA
PICTURE SLIDE PROJECTION APPARATUS
Filed July 25, 1922    2 Sheets-Sheet 1
Fig. 1
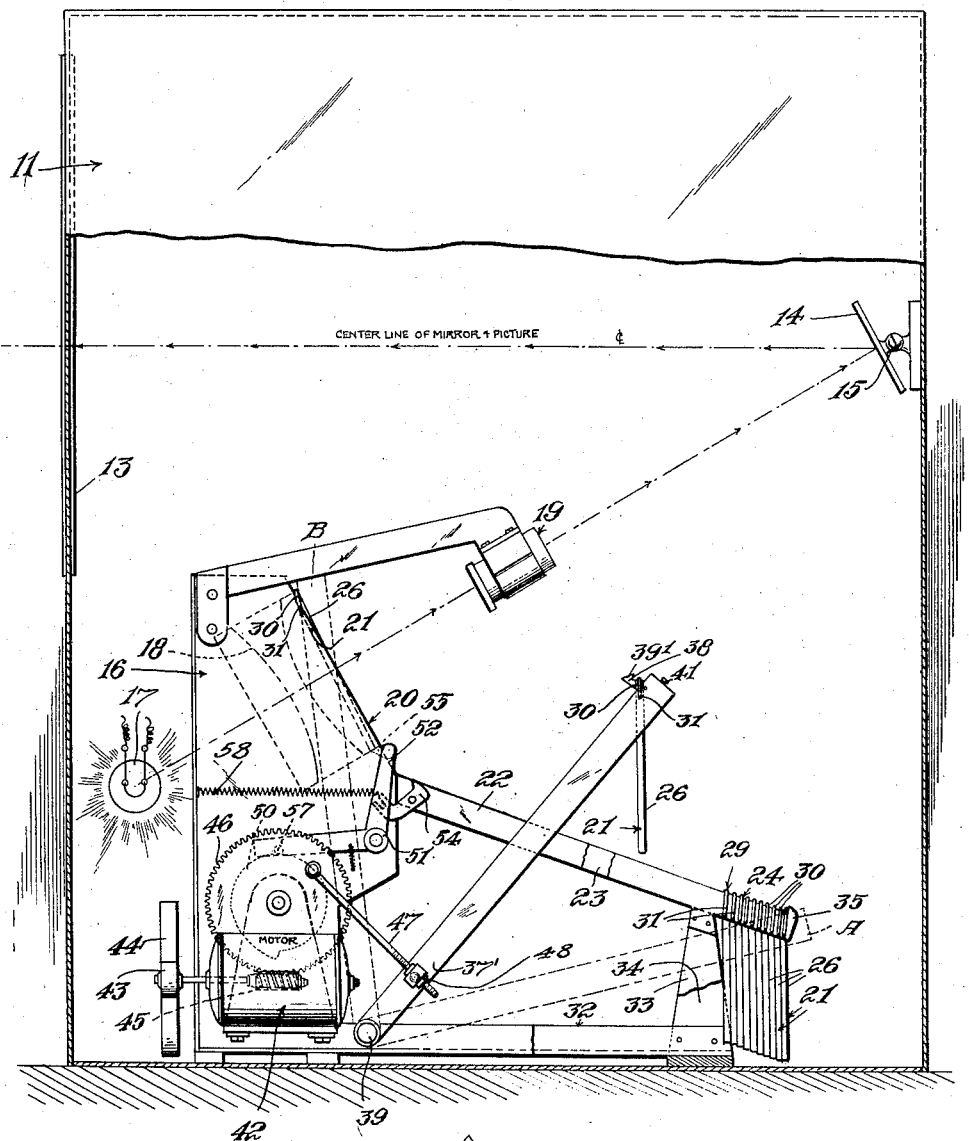
Fig. 10.
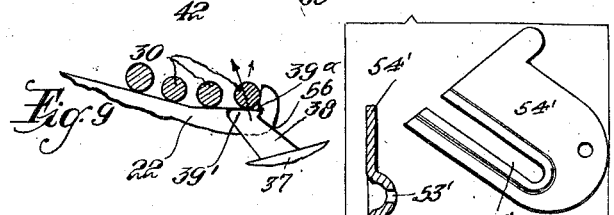
Fig. 9
INVENTOR
Edward Van Altena
BY
ATTORNEY Dec. 21, 1926.
E. VAN ALTENA
1,611,843
PICTURE SLIDE PROJECTION APPARATUS
Filed July 25, 1922  2 Sheets-Sheet 2
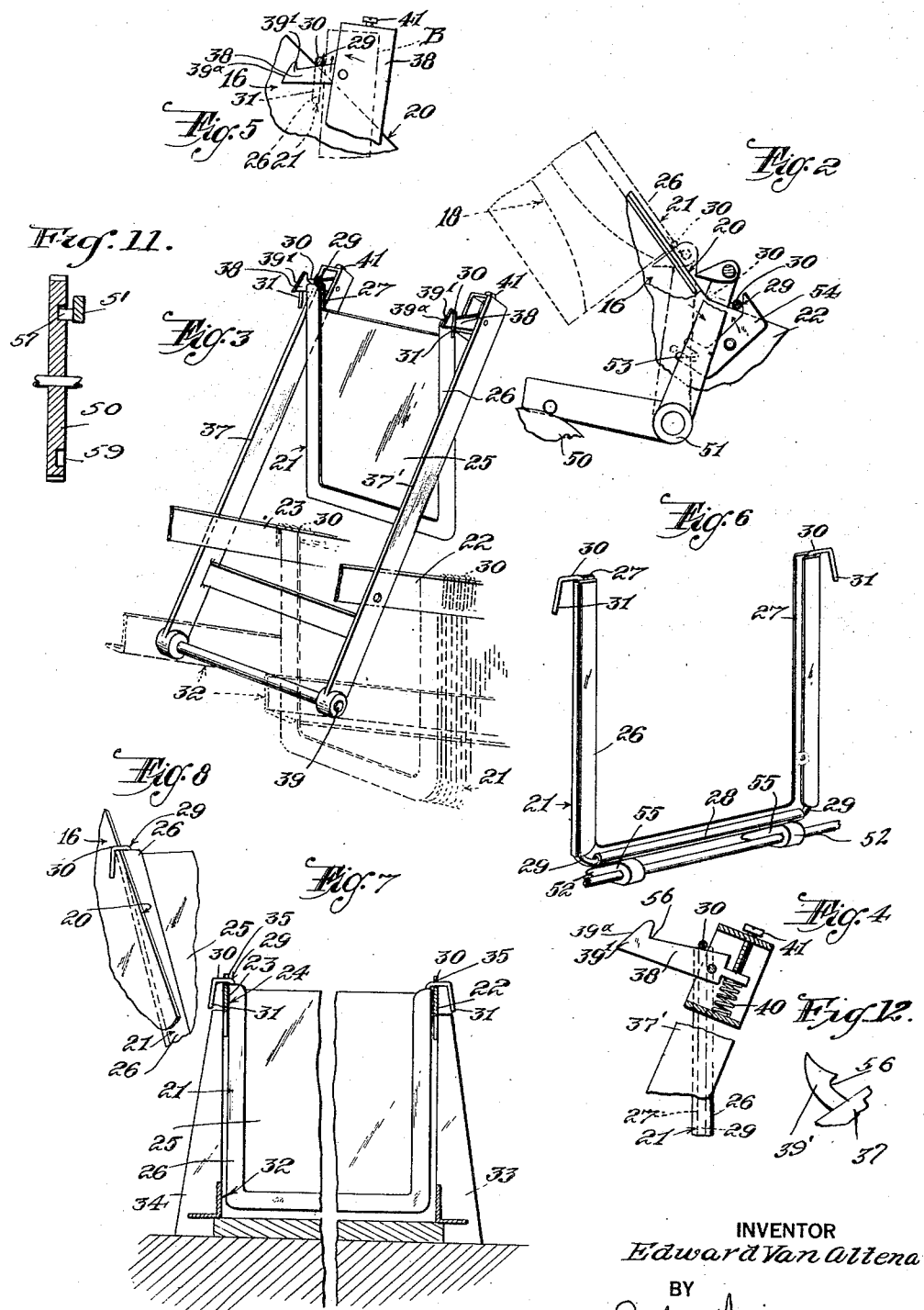
INVENTOR
Edward Van Altena
BY
ATTORNEY Patented Dec. 21, 1926.

1,611,843

UNITED STATES PATENT OFFICE.

EDWARD VAN ALTENA, OF NEW YORK, N. Y.

PICTURE-SLIDE-PROJECTION APPARATUS.

Application filed July 25, 1922. Serial No. 577,374.

This invention relates to apparatus for moving picture slides to a display point from a magazine containing two or more of the slides and returning them from the display point after a prescribed display period has elapsed, the apparatus operating automatically when suitable power is applied thereto, to move the slides seriatim to the display point and return them to the magazine or holder, the machine being adapted to operate irrespective of the number more than one of the slides in the magazine.

The preferred embodiment of my invention is illustrated in the accompanying drawings in which:—

Figure 1 is a side elevation of my device with a part of its casing broken away.

Fig. 2 is a detail view of the mechanism for holding the slide in, and releasing it from, display position.

Fig. 3 is a partial perspective view of the means for lifting or conveying a slide from the magazine to the display point.

Figs. 4 and 5 show details of the picker arms action and mounting.

Fig. 6 is a perspective view of a slide holder.

Fig. 7 is a partial vertical transverse view taken along the lines 7—7 in Fig. 1.

Fig. 8 shows a detail of the inclined guides and the manner of engagement therewith of the slide holders.

Fig. 9 shows a detail of the operation of the picker arms upon the slides in the magazine.

Fig. 10 is a detail of a modified pawl.

Fig. 11 is a detail of a modified operating mechanism for the bell crank.

Fig. 12 is a detail of a modified picker arm.

In the embodiment of my invention chosen for the purpose of illustration, the mechanism is enclosed in a casing or cabinet 11, having an aperture which is closed by means of any suitable material to form a picture screen 13. Concentrically arranged with this screen and upon the opposite wall of the cabinet, is a reflecting disc, plate or mirror 14, adjustably mounted on the wall of the cabinet by the ball hinge joint 15, whereby the mirror can be adjusted in any direction.

Within the cabinet is the projecting mechanism which consists of a frame supporting a suitable lighting element 17, a condenser 18, and a lens 19, the alignment of the light 17, condenser 18 and lens 19 being such that it is at an angle to the cabinet and being such that the mirror 14, when properly adjusted will deflect a ray of light coming to it through the condenser and lens whereby it is reflected to the screen 13 at right angles thereto. The right angled relation between the screen and the reflected or deflected ray is important and the mirror is made adjustable to permit this relation to be maintained at all times.

Adjacent the upper face of the container 18 is an inclined display station or point 20 for the slides 21 and in Figure 1 it will be seen that one of the slides 21 is at the display point in display position. Extending from the display position are two inclined guides 22 and 23 which convey a slide from display position to the magazine 24. The slides comprise the usual transparency 25 adapted to be placed in a sliding holder 26 which is substantially U-shaped. The slide holder has laterally extending channels 27 into which the transparency 25 is removably placed and the holder has a lip 28 at its bottom to support the transparency. The holder is preferably reinforced about its edges by a wire 29 and this wire terminates in two laterally extending hooks 30 having angular ends 31. Herein where reference is made to a slide, it is to be understood that I mean a transparency and its supporting holder or equivalent elements.

The frame 16 has a bottom extension 32 on which is supported standards or uprights 33 and 34 which respectively support guides 22 and 23. The guides 22 and 23 terminate in a stop 35 for preventing the slides from sliding off of the guides. That portion of the guides adjacent the stop 35 may be horizontal to receive any desired number of slides, say two. This facilitates the pick-up lever to lift a slide from the magazine, without interfering with adjacent slides.

As my machine is devised to automatically display the slides one after another, I have devised automatic means for conveying or elevating a slide from the magazine into display position and then after an interval of display, releasing the slide and guiding it automatically back to the magazine. These means comprise a slide conveying means or slide carrier, which may be a pivotally mounted carrier of the type shown herein, comprising two arms 37 and 37' pivoted at 39 to the frame. These arms are sufficiently spaced apart to straddle a slide. Their upper extremities are bent over wherein each is a pivoted picker arm 38 having a substantially spear shaped head 39' thereon. The head 39' may have the configuration as seen in Fig. 12 if desired, as this form prevents accidental picking up of more than one slide. The undercut or angular portion 56 prevents a slide from falling off the hook when the carrier is moving the slide to display position. These picker arms have a spring 40 bearing thereagainst which tends to press them downwardly. An adjustable stop 41, or other suitable mechanism, is provided to limit their downward movement.

The carrier is adapted to be rotated by means of a motor 42 operating through friction discs or gears 43 and 44, whereby the effective speed of the motor is reduced and the wheel 44, by means of the worm 45, rotates the gear 46 which has connected thereto a connecting rod 47 adjustably secured to the carrier at 48, whereby rotation of the gear 46 oscillates the carrier. Therefore, when the carrier 36 oscillates, it moves downwardly until it takes the position shown in dotted lines at A which is the limit of its downward movement. As the carrier moves upwardly, the picker arms 38 move upwardly against the hooks 30 of the slide (Fig. 9) whereby their inclined face 39$^a$ engages the hook 30 of the lowermost slide in the magazine and continued upward movement of the carrier causes the lowermost slide to be elevated out of the magazine and as it is elevated, its hooks 30 slide along the inclined face 39$^a$ of the picker arms 38 until they slide over the spear head and are supported on the upper edge of the picker arms adjacent to the carrier arms 37 and 37' as shown in Fig. 4. The carrier proceeds upwardly into its extreme upward position marked B, whereupon the slide is freed from its carrier by being slid upwardly by shearing action of bell-crank means thereunder and is deposited at the display point 20 in display position by means hereinafter described.

As the slide is to be held at the display point in display position for a predetermined period and then released to slide therefrom into the magazine, I provide means intermedially operated to hold the slide in display position (in which the hooks 30 of the slide are above, free and clear of the picker-arm 38) and then to release it therefrom and these means include a cam 50 on the gear wheel 46 adapted to operate a spring pressed pivoted bell crank arrangement 51 having two supporting members 52. The bell crank arrangement is adapted to hold a slide in display position when the bell crank 51 is in one position, as shown in full lines in Fig. 1 and dotted lines in Fig. 5, and adapted to release the slide from display position when in the position shown in full lines in Fig. 2, as more fully hereinafter described. A pin 57 in the bell crank 51 engages the cam surface, and a spring 58 returns the part 51 to its initial position after actuation by the cam. The spring may be dispensed with, however, if a slot 59 is provided within the cam 50, as shown in Fig. 11 adapted to receive the pin 57. Associated with the bell crank 51 and operated by a pin 53 thereon is a pivoted pawl element 54 carried by each of the guides 22 and 23, whereby, when the slide is released from display position as shown in Fig. 2 which slides therefrom until its hooks 30 are caught by the pawls 54. Return movement of the bell cranks 51 cause the pawls to be depressed before the level of the guides 22 and 23 whereby the slide is released from the pawls and slides to the magazine 24. I have found that the form of pawl shown in Fig. 10 is very satisfactory, and the type of slot 53' prevents binding of the pin 53 while engaging the part 54'.

The slide thus engaging the pawl on its descent is forced to a standstill from which point it continues to the magazine slowly, which prevents undue noise and accidental jumping off the guideways.

The movement of the bell crank 51 whereby it moves intermedially into and out of position to support a slide in display position is so timed that as the carrier and slide reach position B from the magazine 24 to the display point, that is, the position B, the slide supporting members 52 move inwardly to engage the slide. Because of their inclined faces 55, (the slide is by engagement therewith to move) the slide and its hooks 30 are moved upwardly along the members 20 (of the display point) until the hooks 30 are held raised above the top of the picker arms 38, whereby the carrier is free to return to its A position, leaving the slide at the display point. After the desired display interval, rotation of the motor and the gear 46 moves the bell crank outwardly with its slide supporting members 52 and the slide falls from display position until it is caught by the pawls 54. In the meantime, the carrier has picked up the next slide from the magazine and conveys it to the display point. During passage of the carrier from the position A to position B with its new slide, the slide supports 52 are moving inwardly, whereby the pawls 54 releases the slide to let it pass downwardly along the guides 22 and 23 to the magazine, and continued inward movement of the slide supports 52 engage the bottom of the slide, move it upwardly to let the carrier release it from the slide, and so on, this cycle being repeated indefinitely.

What I claim is:—

1. A projection apparatus for picture slides having a magazine, a slide display point, means for supporting a slide at the display point, means for carrying a slide from the magazine to the display point, and bell crank means producing a shearing action for forcing the slide upwardly and free from the carrying means.

2. A projection apparatus for picture slides having a magazine for the slides, a display point for the slides, and a pivoted carrier for automatically conveying one slide after another from the magazine to the display point and pivoted arms on said carrier for picking up and holding said slides.

3. A projection apparatus for picture slides having a magazine, a display point for the slides, means for conveying slides from the magazine to the display point, angled means for guiding a slide from the display point to the magazine, and pawl means for breaking the travel of a slide along the guiding means.

4. The device of claim 2, with spring pressed arms on said carrier for picking up one slide at a time.

5. The device of claim 3, said display point including a pivoted member upon which the slide is supported, said pivoted member actuating said travel breaking means.

6. The device of claim 3, said travel breaking means including a member having a slot therein, and a peripheral projection thereon.

7. The device of claim 3, said travel breaking means including a pivoted substantially U-shaped member.

8. The device of claim 3, said travel breaking means including a pivoted substantially U-shaped member, said pivot point being adjacent the lower part of the U.

9. The device of claim 3, said supporting means including a bell crank having a lug thereon.

10. The device of claim 3, said supporting means including a bell crank having a lug thereon, and a motor operated cam engaging said lug to impart rotative movement to said bell crank.

In testimony whereof I have affixed my signature to this specification.

EDWARD VAN ALTENA.